(12) United States Patent
Yan et al.

(10) Patent No.: US 9,582,812 B2
(45) Date of Patent: *Feb. 28, 2017

(54) USING POLLING RESULTS AS DISCRETE METRICS FOR CONTENT QUALITY PREDICTION MODEL

(71) Applicant: Facebook, Inc., Menlo Park, CA (US)

(72) Inventors: Rong Yan, Mountain View, CA (US); John Hegeman, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/253,138

(22) Filed: Apr. 15, 2014

(65) Prior Publication Data

US 2014/0229234 A1 Aug. 14, 2014

Related U.S. Application Data

(63) Continuation of application No. 13/082,396, filed on Apr. 7, 2011, now Pat. No. 8,738,698.

(51) Int. Cl.
 *G06Q 30/02* (2012.01)
 *G06N 5/04* (2006.01)

(52) U.S. Cl.
 CPC ......... *G06Q 30/0245* (2013.01); *G06N 5/048* (2013.01); *G06Q 30/02* (2013.01); *G06Q 30/0202* (2013.01)

(58) Field of Classification Search
 USPC ....... 709/204, 217–219; 707/748; 705/14.41, 705/14.42, 14.44, 14.43
 See application file for complete search history.

(56) References Cited

U.S. PATENT DOCUMENTS

| | | | |
|---|---|---|---|
| 6,412,012 B1 * | 6/2002 | Bieganski et al. | 709/232 |
| 6,757,691 B1 * | 6/2004 | Welsh et al. | |
| 6,804,659 B1 | 10/2004 | Graham et al. | |
| 7,587,391 B1 * | 9/2009 | Bostock | G06F 17/30864 |
| 2004/0054572 A1 * | 3/2004 | Oldale et al. | 705/10 |

(Continued)

OTHER PUBLICATIONS

United States Office Action, U.S. Appl. No. 13/082,396, Feb. 28, 2013, ten pages.

(Continued)

*Primary Examiner* — Abdullahi E Salad
(74) *Attorney, Agent, or Firm* — Fenwick & West LLP

(57) ABSTRACT

A social networking system presents content items to users, who then provide feedback regarding pairs of content items. The feedback includes a selection of a content item of the pair of content items that was preferred by the user over the other content item. The social networking system uses this information to train a predictive model that scores content items based on quality. The content items may be advertisements. The social networking system uses the pair-wise comparisons of the advertisements to determine feedback coefficients in an advertising quality score prediction model using regression analysis of the pair-wise comparisons for each predictive factor in the model. In this way, the pair-wise comparisons are used to train the prediction model to understand which advertisements are more enjoyable than others. A feedback coefficient for each predictive factor may be computed based on the preferences received from the group of users.

23 Claims, 5 Drawing Sheets

(56) References Cited

U.S. PATENT DOCUMENTS

| | | |
|---|---|---|
| 2007/0266031 A1* | 11/2007 | Adams et al. .................. 707/10 |
| 2008/0153520 A1 | 6/2008 | Kirtane |
| 2008/0228537 A1* | 9/2008 | Monfried et al. ................ 705/7 |
| 2009/0172026 A1* | 7/2009 | Brownholtz et al. ...... 707/104.1 |
| 2010/0031162 A1* | 2/2010 | Wiser et al. .................. 715/747 |
| 2010/0057548 A1 | 3/2010 | Edwards |
| 2010/0153184 A1 | 6/2010 | Caffrey et al. |
| 2010/0262556 A1 | 10/2010 | Shaya et al. |
| 2011/0099045 A1* | 4/2011 | Carr et al. .................... 705/7.31 |
| 2011/0106630 A1 | 5/2011 | Hegeman et al. |
| 2011/0112981 A1* | 5/2011 | Park et al. .................... 705/347 |
| 2011/0161308 A1* | 6/2011 | Andersen et al. ............ 707/707 |
| 2011/0225608 A1* | 9/2011 | Lopatecki et al. .............. 725/34 |
| 2011/0282730 A1 | 11/2011 | Tarmas |
| 2012/0042262 A1* | 2/2012 | Priyadarshan et al. ....... 715/745 |
| 2012/0174151 A1 | 7/2012 | Reynolds et al. |
| 2012/0221418 A1 | 8/2012 | Smith |

OTHER PUBLICATIONS

United States Office Action, U.S. Appl. No. 13/082,396, Jun. 12, 2013, nine pages.
United States Office Action, U.S. Appl. No. 13/082,396, Sep. 12, 2013, ten pages.

* cited by examiner

_US 9,582,812 B2_

USING POLLING RESULTS AS DISCRETE METRICS FOR CONTENT QUALITY PREDICTION MODEL

RELATED APPLICATION(S)

This application is a continuation of U.S. patent application Ser. No. 13/082,396, filed Apr. 7, 2011. The contents of this application are incorporated herein by reference.

BACKGROUND

This invention relates generally to social networking, and in particular to training a content quality metric prediction model using polling results.

Online advertising has quickly become a major channel through which advertisers market their products and services. Traditional performance metrics are used primarily to determine the effectiveness of advertisements, measured for example by click through and conversion rates. These traditional performance metrics do not evaluate the quality of an advertisement, including the content of the advertisement. Hence, the question of whether users actually enjoyed an advertisement remains unanswered by these performance metrics.

One problem of measuring and predicting the quality of advertising stems from the inherently subjective nature of audiovisual content and people's reactions to it. This is illustrated by the example of a music competition in which three judges rate, on a scale from 1 to 10, the performance of a singer without being able to judge the singer's visual performance. In this hypothetical, the judges are tasked with quantitatively scoring the singer based on the singer's vocal ability and musical performance. Each of the judges may arrive at different scores due to their relative scoring biases. One judge may be very generous in the scoring and only delineate between singers on a much smaller scale than another judge who may be very harsh in his scoring. Regardless, an absolute winner of the competition is eventually determined by normalizing the scores. But the judges' scores are only applicable to the specific singers in the competition, not all singers in the world.

Similar to the singing competition hypothetical, advertising models have relied on the effectiveness of an advertisement, such as asking a focus group how likely they are to buy the product mentioned in the advertisement in the next 6 months, on a scale of 1 to 5. Advertisers and publishers have no way to determine, based on the data gathered, which advertisements are of higher quality and which advertisements are of lower quality. Based on the data gathered, advertisers may only extrapolate on a small sample size the subjective opinions of focus group members. Advertisers rely on the focus groups to determine if the advertisement will be effective, not whether the people in the focus groups actually enjoyed the advertisement.

Attractive advertisements tend to increase engagement with the advertiser's brand, leading to more user traffic on the publisher's website and an increase in the overall advertisement fees collected by the online services. Social networking systems have also enabled advertisers to let users share interesting advertisements with their connections on the social networking system, creating "viral" advertising. This "word of mouth" advertising is difficult to generate because advertisers and publishers do not have an accurate sense of what advertisements are enjoyable, and, consequently, more likely to go viral.

To take advantage of the millions of users that use social networking systems, advertisers need better metrics on the content of their advertisements. Publishers of advertisements have not created tools or techniques for advertisers to receive feedback on the quality of their advertisements with respect to the user experience of the content within the advertisements. Tools and methods are needed to address this problem of determining a discrete measurement of content quality.

SUMMARY

Embodiments of the invention relate to predicting a quality metric for content based on user polling. A social networking system presents content items to users, who then provide feedback regarding pairs of content items. The feedback includes a selection of a content item of the pair of content items that was preferred by the user over the other content item. The social networking system uses this user feedback information to train a predictive model that scores content items based on a prediction of the perceived quality of the content items to a user.

In one embodiment, the content items are advertisements that are provided by advertisers. The social networking system uses the pair-wise comparisons of the advertisements to determine feedback coefficients in an advertising quality score prediction model using regression analysis of the pair-wise comparisons for each predictive factor in the model. In this way, the pair-wise comparisons are used to train the prediction model to understand which advertisements are more enjoyable than others.

In one embodiment, a feedback coefficient for each predictive factor is computed based on the preferences received from the group of users. The feedback coefficient is computed by estimating the feedback response from similar users based on a statistical model. The statistical model may take into account the feedback received from the group of users.

In one embodiment, the social networking system generates a content item in response to receiving a request for the content item from a particular user. The content item may be embedded with the selected advertisements and then sent to the particular user. The content item may also include one or more graphical user elements (e.g., icons, symbols, a string of characters or any visual elements) or any combination thereof for receiving the feedback response about the selected advertisements from the user.

In one embodiment, feedback coefficients for predictive factors in the model are computed by logistical regression analysis. A quality score for a content item is calculated using a formula that combines feedback coefficients multiplied by the probabilities that a user feedback event is likely to occur along with other probability values generated by other processes. For example, positive or negative feedback probabilities may be generated by other processes based on feedback received from users. The feedback probabilities represent the users' expected interest in the advertisement. The feedback coefficients represent the weight given to the value of the advertisement to the social networking system. The combination of the feedback coefficients multiplied by the feedback probabilities may be linear and non-linear. In one embodiment, quality scores may be computed for content items, such as advertisements, for ranking purposes in presenting the content items to users of the social networking system.

DETAILED DESCRIPTION

Figure 1A:
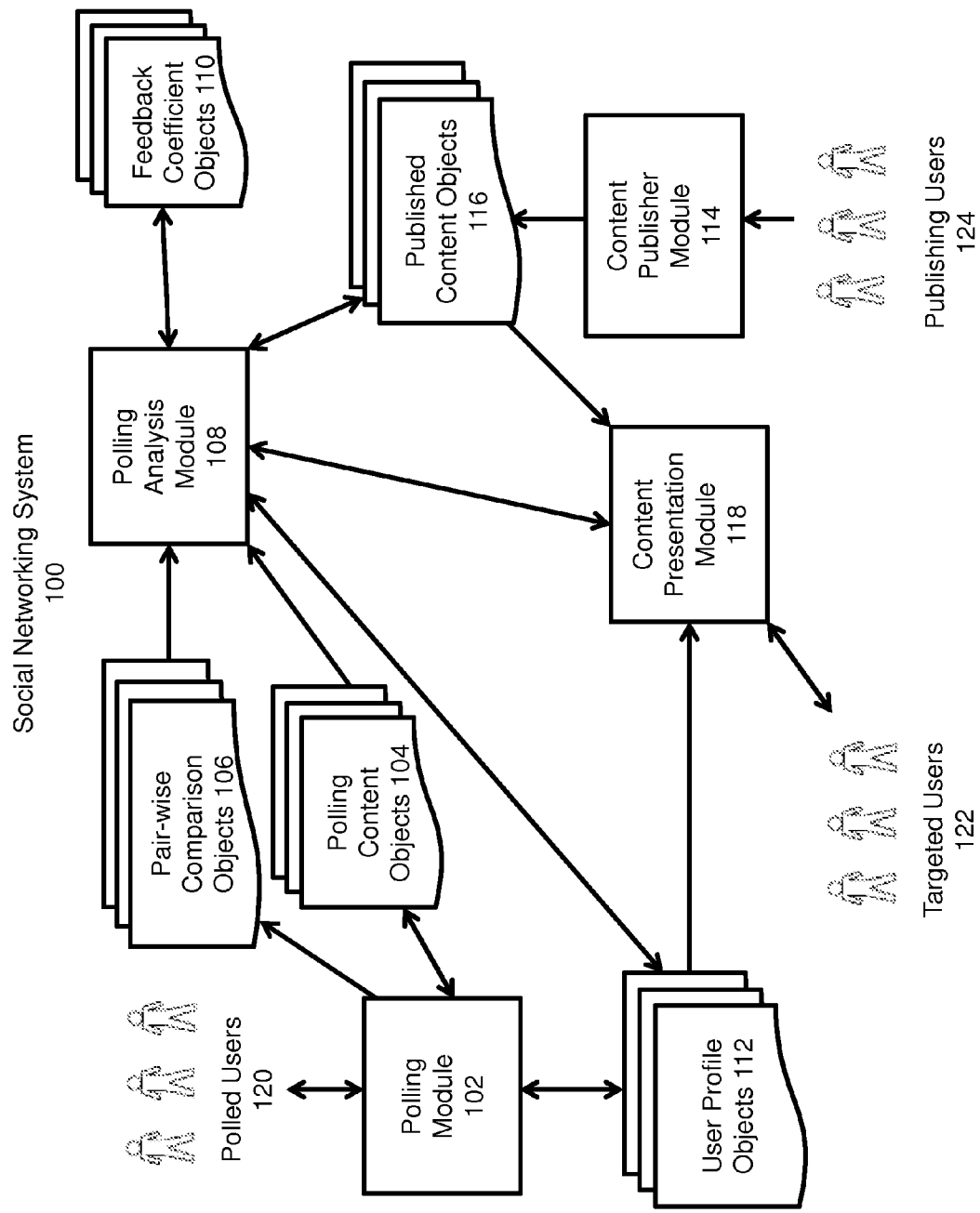
FIG. 1A is a conceptual diagram illustrating using polling results to predict content quality metrics, according to one embodiment.

A social networking system offers its users the ability to communicate and interact with other users of the social networking system. Users join the social networking system and add connections to a number of other users to whom they desire to be connected. Users of social networking system can provide information about them, and this information is stored as user profiles for the users. For example, users can provide their age, gender, geographical location, education history, employment history and the like. The information provided by users may be used by the social networking system to direct information to the user. For example, the social networking system may recommend social groups, events, and potential friends to a user. The social networking system may also use user profile information to direct content items, such as advertisements, to the user, ensuring that only relevant advertisements are directed to the user. Relevant advertisements ensure that advertising spending reaches their intended audiences, rather than wasting shrinking resources on users that are likely to ignore the advertisement. Similarly, relevant content items enhance the user experience on the social networking system, enabling a user to view more interesting and relevant content items.

After a content item, such as an advertisement, has been presented to a user of a social networking system, a user may choose to mark that advertisement as misleading, offensive, uninteresting, repetitive, or otherwise not relevant. The selection of an "X" on the advertisement provides user feedback to the social networking system for millions of advertisements that are served to users. Using this user feedback, feedback probabilities may be generated to estimate the likelihood that a user may mark an advertisement as misleading, offensive, uninteresting, or otherwise not relevant. Similarly, users may select an "X" on all content items on the social networking system to remove that content item from the stream of content items being displayed to the user. Such a selection of an "X" on a content item indicates the user's disapproving preference about that content item. Conversely, a content item may be expressly "liked," meaning that the user has selected a link that indicates the user's approving preference about the content item. A user may also impliedly signify approval of a content item by interacting with it, such as re-sharing the content item or commenting on it. A feedback probability estimating the likelihood that a user may click on an advertisement may also be generated using the user's past history in clicking on advertisements or particular interest in the topic of the advertisement, such as a pop music concert.

For advertisements, as with other types of content items, users may be more or less likely to share the advertisement with their friends and connections on the social networking system. Recording the history of a user's sharing patterns, including the type of content item such as an advertisement for an upcoming Britney Spears show, the social networking system can generate a probability value for a user that the user will share a newly-presented advertisement. These probability values and feedback probabilities may be obtained and then used to determine overall quality scores for users, as described for example in U.S. application Ser. No. 12/611,874, entitled "User Feedback-Based Selection and Prioritizing of Online Advertisements," filed on Nov. 3, 2009, which is hereby incorporated by reference.

As used herein, feedback coefficients are numerical values that indicate objective measurements of quality for the feedback probabilities and other probability values that may be combined to generate an overall quality score. Quality scores may be generated for content items for the purpose of ranking highly relevant content items for users of a social networking system. Quality scores may also be calculated for advertisements to rank advertisements that will be shown to users that are of higher quality, higher relevance, and/or higher value to the social networking system and the advertisers (e.g., since higher quality advertisements encourage engagement with the social networking system).

Figure 1B:
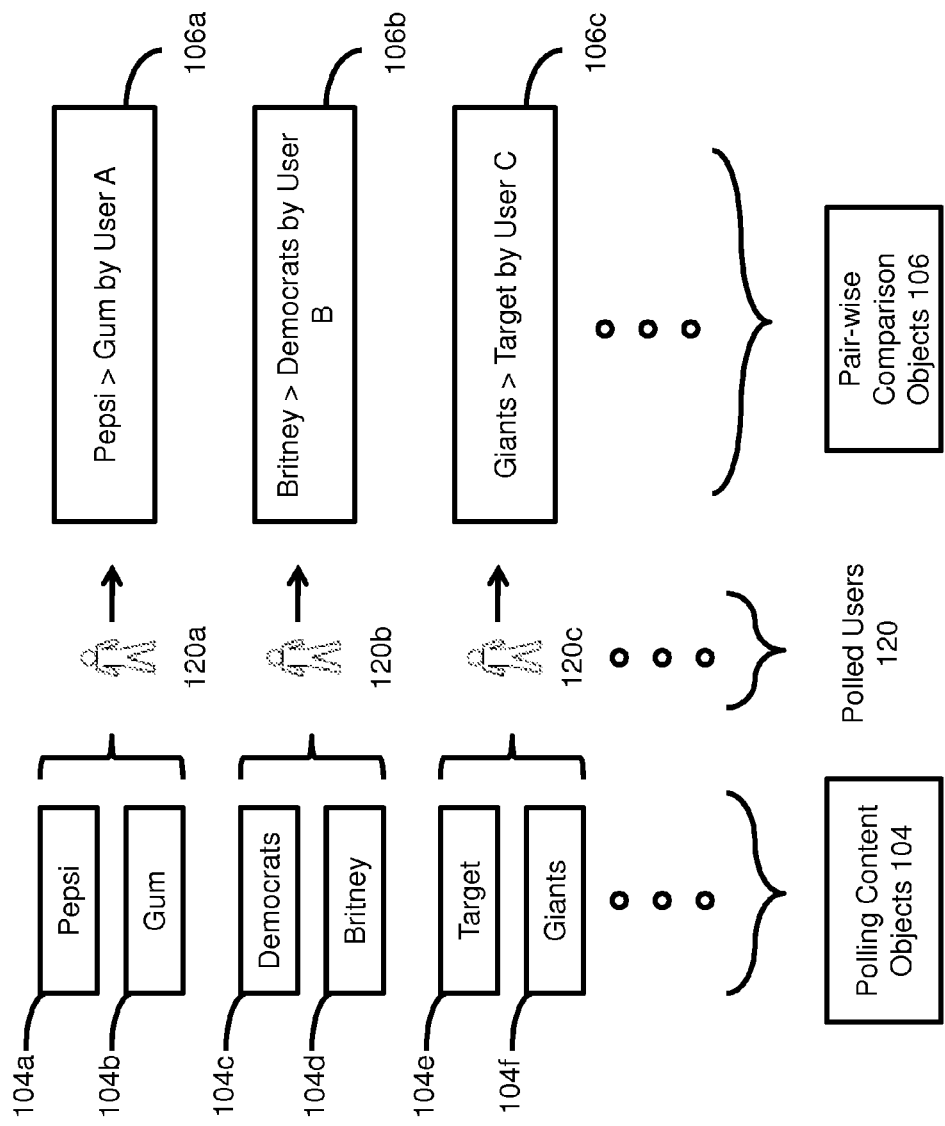
FIG. 1B is a conceptual diagram illustrating pair-wise polling preferences, according to one embodiment.

FIG. 1A is a high level conceptual diagram illustrating a social networking system 100 for predicting a quality metric for content items, according to one embodiment. A polling module 102 interfaces with polled users 120 to request a selection of a preference over two polling content objects 104. For example, as illustrated in FIG. 1B, the polling module 102 may ask a polled user 120a to choose the more enjoyable advertisement between a Pepsi ad, polling content object 104a, and a Gum ad, polling object 104b. In one embodiment, the overall user experience is the dimension by which the polled user 120a is asked to select a preference. In another embodiment, a more specific question relating to one aspect of the user experience, such as asking "How engaged were you with the ad?" may be asked by the polling module 102. As shown in FIG. 1B, the polled user 120a preferred the Pepsi ad over the Gum ad. This preference is stored as a pair-wise comparison object 106a.

Pair-wise comparison objects 106 are used by a polling analysis module 108 to quantify the objective quality of polling content objects 104. The polling analysis module 108 uses regression models to generate feedback coefficients that are stored as feedback coefficient objects 110. Additionally, user profile objects 112, associated with each user of the social networking system 100, are used by the polling analysis module 108 in order to generate a quality score for polling content objects 104 and published content objects 116 that are submitted by publishing users 124, such as advertisers, using the content publisher module 114.

Returning to the above example, polled user 120a had a preference of a Pepsi ad over a Gum ad, as illustrated by FIG. 1B. Polled user 120b, presented with polling content objects 104c and 104d, preferred a Britney ad over a Democrats ad, as stored in the pair-wise comparison object 106b. Polled user 120c disfavored a Target ad, polling content object 104e, over a Giants ad, polling content object 104f, as stored in the pair-wise comparison object 106c. It is noted that polling content objects 104 need not be regular advertising banners, but may also include interactive games, videos, fan pages, heavy involvement in a group dedicated to a brand, and so on, in one embodiment.

In another embodiment, pair-wise comparisons may be captured by analyzing declared interests in user profile objects in conjunction with the frequency of interaction with those interests. For example, if a user declares an interest in Cher and Britney, but only shares content items that are related to Britney, the polling module 102 may infer that the user has a preference of Britney over Cher and store that preference as a pair-wise comparison object 106. In yet another embodiment, a polling module 102 uses such information about users from user profile objects 112 to select polling content objects 104 that are relevant to polled users 120. Then, pair-wise comparison objects 106 may be generated after a polled user 120 explicitly chooses one polling content object 104 over another.

A content presentation module 118 may use the quality metric, or score, generated by the polling analysis module 108 in adjudicating the over quality, and therefore, potential revenue generator, of a published content object 116 for ranking and targeting purposes. Targeted users 122 receive published content objects 116 from the content presentation module 118 as part of the user experience in the social networking system 100. In one embodiment, the content presentation module 118 targets advertisements, published content objects 116, to targeted users 122 using the quality score generated by the polling analysis module 108. In another embodiment, the content presentation module 118 targets other content items, such as links, photos, video, and applications, that are stored as published content objects 116 and to targeted users 122 as ranked by the quality score assigned by the polling analysis module 108. Ranking and targeting content items based on the quality score increases the likelihood that users will remain engaged on the social networking system 100, as well as the likelihood that users will share the high quality content items with their connections on the social networking system 100. Higher engagement with the social networking system 100, as well as higher engagement with advertisements, benefits both advertisers and administrators of the social networking system because the advertising dollars have more efficiency in brand penetration, impressions, and other measurable marketing metrics.

System Architecture

Figure 2:
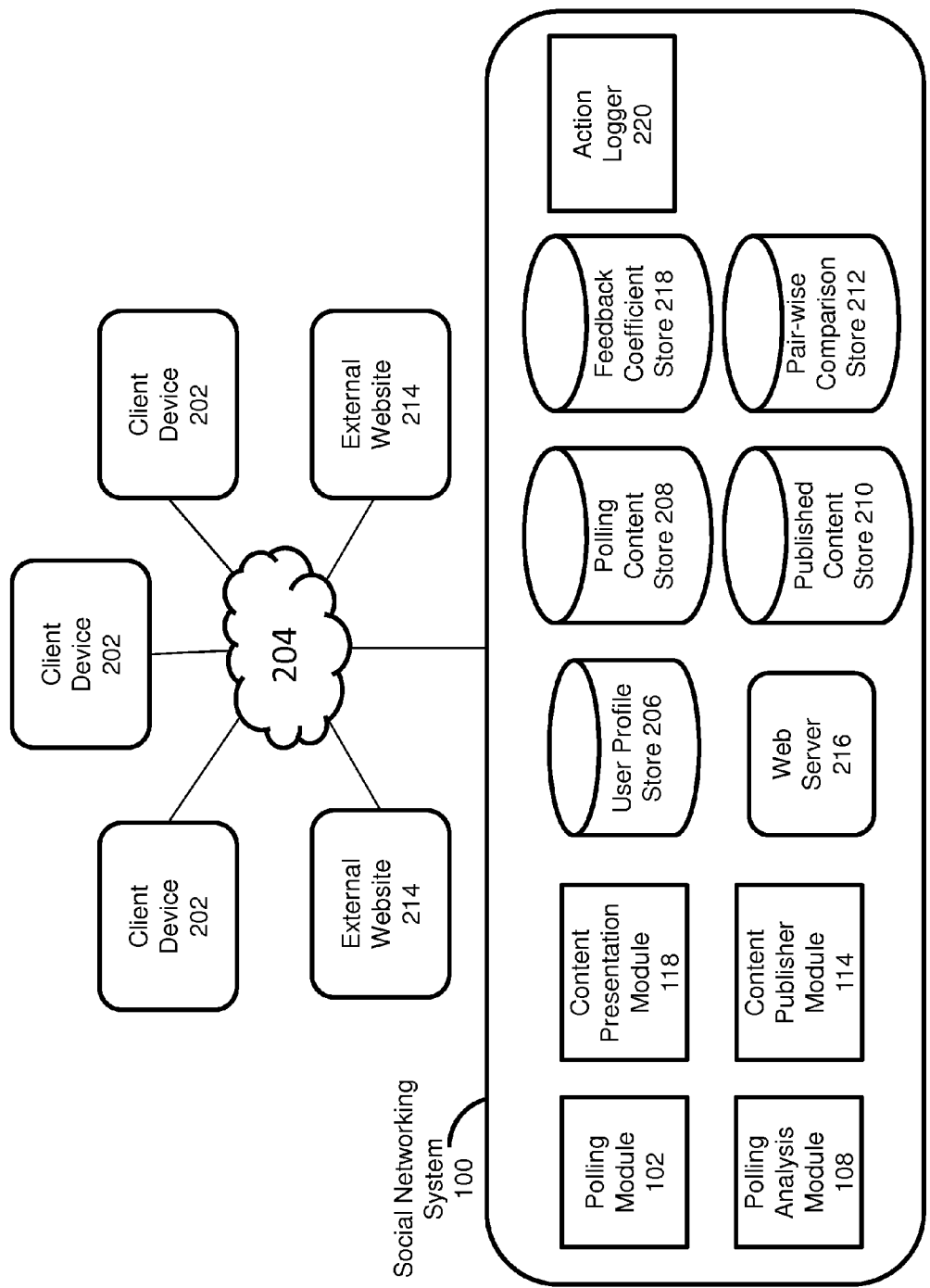
FIG. 2 is a network diagram of a system for using polling results to predict content quality metrics, showing a block diagram of the social networking system, in accordance with an embodiment.

FIG. 2 is a high level block diagram illustrating a system environment suitable for predicting quality metrics of content items in a social networking system, in accordance with an embodiment of the invention. The system environment comprises one or more client devices 202, the social networking system 100, a network 204, and external websites 214. In alternative configurations, different and/or additional modules can be included in the system.

The client devices 202 comprise one or more computing devices that can receive user input and can transmit and receive data via the network 204. In one embodiment, the client device 202 is a conventional computer system executing, for example, a Microsoft Windows-compatible operating system (OS), Apple OS X, and/or a Linux distribution. In another embodiment, the client device 202 can be a device having computer functionality, such as a personal digital assistant (PDA), mobile telephone, smart-phone, etc. The client device 202 is configured to communicate via network 204. The client device 202 can execute an application, for example, a browser application that allows a user of the client device 202 to interact with the social networking system 100. In another embodiment, the client device 202 interacts with the social networking system 100 through an application programming interface (API) that runs on the native operating system of the client device 202, such as iOS 4 and ANDROID.

In one embodiment, the network 204 uses standard communications technologies and/or protocols. Thus, the network 204 can include links using technologies such as Ethernet, 802.11, worldwide interoperability for microwave access (WiMAX), 3G, 4G, CDMA, digital subscriber line (DSL), etc. Similarly, the networking protocols used on the network 204 can include multiprotocol label switching (MPLS), the transmission control protocol/Internet protocol (TCP/IP), the User Datagram Protocol (UDP), the hypertext transport protocol (HTTP), the simple mail transfer protocol (SMTP), and the file transfer protocol (FTP). The data exchanged over the network 204 can be represented using technologies and/or formats including the hypertext markup language (HTML) and the extensible markup language (XML). In addition, all or some of links can be encrypted using conventional encryption technologies such as secure sockets layer (SSL), transport layer security (TLS), and Internet Protocol security (IPsec).

FIG. 2 contains a block diagram of the social networking system 100. The social networking system 100 includes a user profile store 206, a polling store 208, a published content store 210, a pair-wise comparison store 212, a web server 216, a feedback coefficient store 218, a polling module 102, a polling analysis module 108, a content publisher module 114 and a content presentation module 118. In other embodiments, the social networking system 100 may include additional, fewer, or different modules for various applications. Conventional components such as network interfaces, security functions, load balancers, failover servers, management and network operations consoles, and the like are not shown so as to not obscure the details of the system.

User account information and other related information for a user are stored in the user profile store 206. The user profile information stored in user profile store 206 describes the users of the social networking system 100, including biographic, demographic, and other types of descriptive information, such as work experience, educational history, gender, hobbies or preferences, location, and the like. The user profile may also store other information provided by the user, for example, images or videos. In certain embodiments, images of users may be tagged with identification information of users of the social networking system 100 displayed in an image. A user profile store 206 maintains profile information about users of the social networking system 100, such as age, gender, interests, geographic location, email addresses, credit card information, and other personalized information. The user profile store 206 also maintains references to the actions stored in the action log 104 and performed on objects in the content store 212.

The web server 216 links the social networking system 100 via the network 204 to one or more client devices 202; the web server 216 serves web pages, as well as other web-related content, such as Java, Flash, XML, and so forth. The web server 216 may provide the functionality of receiving and routing messages between the social networking system 100 and the client devices 202, for example, instant messages, queued messages (e.g., email), text and SMS (short message service) messages, or messages sent using any other suitable messaging technique. The user can send a request to the web server 216 to upload information, for example, images or videos that are stored in the published content store 210. Additionally, the web server 216 may provide API functionality to send data directly to native client device operating systems, such as iOS, ANDROID, webOS, and RIM.

The action logger 220 is capable of receiving communications from the web server 216 about user actions on and/or off the social networking system 100. The action logger 220 populates an action log with information about user actions to track them. Such actions may include, for example, adding a connection to the other user, sending a message to the other user, uploading an image, reading a message from the other user, viewing content associated with the other user, attending an event posted by another user, among others. In addition, a number of actions described in connection with other objects are directed at particular users, so these actions are associated with those users as well. The polling module 102 may, in one embodiment, use the information in the action log as recorded by the action logger 220 to generate pair-wise comparison objects 106 from the frequency of interaction with a certain keyword, topic, or interest. In one embodiment, the polling module 102, in one embodiment, may use information gathered from external websites 214 via the web server 216 over the network 204 in order to generate pair-wise comparison objects 106 stored in the pair-wise comparison store 212, measuring the interaction (clicks) on external websites. For example, a user who visits the external website 214 for GAP, gap.com, one hundred times a month may have a strong brand affinity for GAP. Contrastingly, if that user only visits CNN.com once a month, a pair-wise comparison object 106 may be generated by the polling module 102 to indicate that the user prefers content on the external websites 214 for GAP over CNN.

Pair-wise comparison objects 106 are generated by the polling module 102 and are stored in the pair-wise comparison store 212 in the social networking system 100. Polling content objects 104 are stored in the polling content store 208 and published content objects 116 are stored in the published content store 210. Feedback coefficient objects 110 generated by the polling analysis module 108 are stored in the feedback coefficient store 218.

The content presentation module 118 may provide published content objects 116 stored in the published content store 210 to client devices 202 and/or external websites 214 via the web server 216 over the network 204. The content publisher module 114 may receive content items from an external website 214 or client devices 202 over the network 204 via the web server 216.

Figure 3:
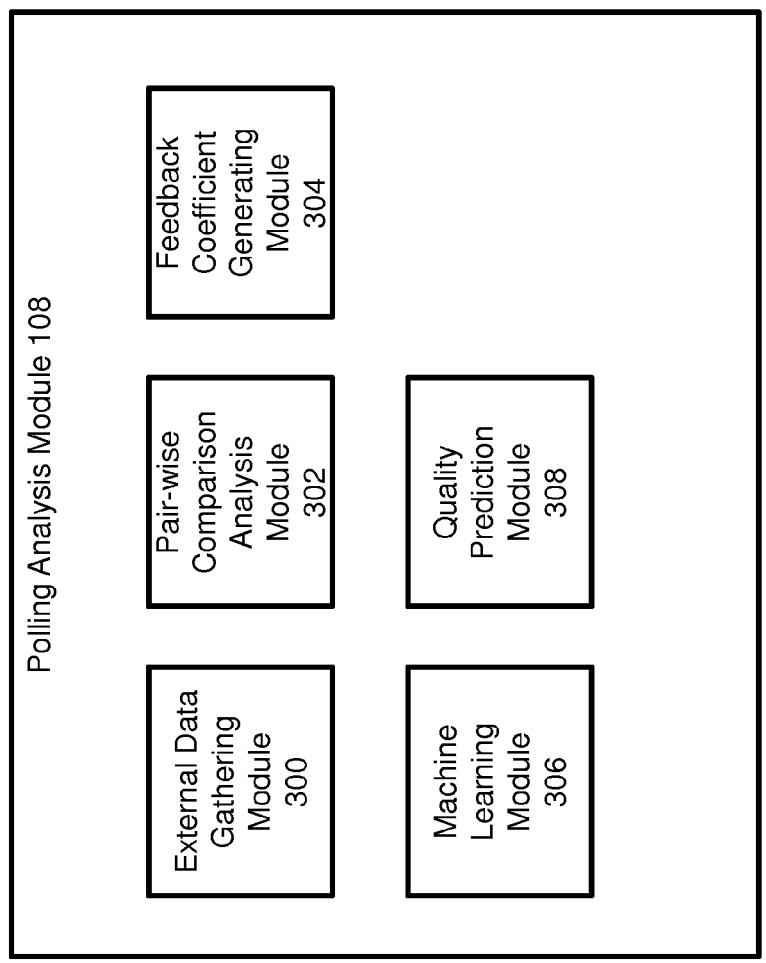
FIG. 3 is a high level block diagram illustrating a polling analysis module that includes various modules for developing a predictive model of quality metrics for content items on a social networking system, in accordance with an embodiment.

Developing a Predictive Model to Measure Quality in Content Items Based on Polling FIG. 3 illustrates a high level block diagram of the polling analysis module 108 in further detail, in one embodiment. The polling analysis module 108 includes an external data gathering module 300, a pair-wise comparison analysis module 302, a feedback coefficient generating module 304, a machine learning module 306, and a quality prediction module 308. These modules may perform in conjunction with each other or independently to develop a predictive model to measure quality of content items based on polling users of a social networking system 100.

An external data gathering module 300 interfaces with external websites to gather information about users of the social networking system 100. External websites may be used by the polling module 102 to poll a user regarding a pair of advertisements, for example. Information gathered from the external websites by the external data gathering module 300 would be used by the polling analysis module 108 in generating a pair-wise comparison object 106, in one embodiment. Additionally, an external data gathering module 300 may, in one embodiment, use the action logger 220 in recording the actions of users on external websites and synthesizing a pair-wise comparison object 106 based on the actions, such as purchasing a pair of Puma shoes or clicking on an advertisement hosted on an external website for a new Mini Cooper. In another embodiment, third parties may help aggregate such information about users of a social networking system 100 that indicates preferences between different types of advertising based on the actions of the users. As a result, the generation of pair-wise comparison objects 106 can be outsourced, in one embodiment.

A pair-wise comparison analysis module 302 develops regression models and identifies predictive factors that surface as a result of gathering pair-wise comparison information. For example, suppose that a polled user 120 chooses an advertisement for Britney's upcoming concert tour over an advertisement for The Strokes's new album, and similar users to the polled user 120 also overwhelmingly choose Britney advertisements over advertisements for Mariah Carey's newest music video. The pair-wise comparison analysis module 302, using the feedback coefficient generating module 304, recognizes predictive factors that indicate a higher feedback coefficient value. In this example, the similarity of users, such as demographics, location, and interests, was a predictive factor in how the similar users preferred the Britney advertisements over other music advertisements. Using regression analysis for that predictive factor, a feedback coefficient value can be generated using the feedback coefficient generating module 304.

The feedback coefficient generating module 304 uses regression models to estimate feedback coefficients for a probability value in a quality score formula on the social networking system 100. Each predictive factor, including the feedback probabilities, and other probabilities, has a separate regression model. The predictive factors, in one embodiment, include the probability that a user will mark the advertisement as uninteresting, repetitive, offensive, or otherwise irrelevant, probability that the user will click on the advertisement, probability that the advertisement is a social advertisement, and probability that the user will share the advertisement with his or her connections on the social networking system. Predictive factors may be added or removed at the discretion of the administrators of the social networking system 100.

The regression model for each predictive factor assigns a feedback coefficient value to each of the predictive factors based on the pair-wise comparisons received from the polled users. A logistic regression can be used to calculate the feedback coefficient value for each of the predictive factors. In one embodiment, the feedback coefficient values are customized according to each user of the social networking system. In such an embodiment, the feedback coefficient value varies depending on the individual user. In another embodiment, the feedback coefficient values for the predictive factors are held constant based on the regression analysis of the pair-wise comparisons received from the polled users. A machine learning module 306 may also be used to finalize the feedback coefficient values in the feedback coefficient generating module 304.

A quality prediction module 308 determines a quality score that indicates how engaged a specific user may be with a particular content item, such as an advertisement. The quality score of an advertisement for a specific user would be a combination of the feedback coefficient values multiplied by their respective probability values associated with the specific user. This combination may, in one embodiment, be non-linear, meaning that some probability values may be exponentially larger than others as selected by administrators of the social networking system 100. The polling analysis module 108, in one embodiment, adapts the regression model to include or exclude predictive factors that are determined to be relevant or not relevant in accurately predicting the quality score of content items based on machine learning and heuristics analysis of the targeted users.

Figure 4:
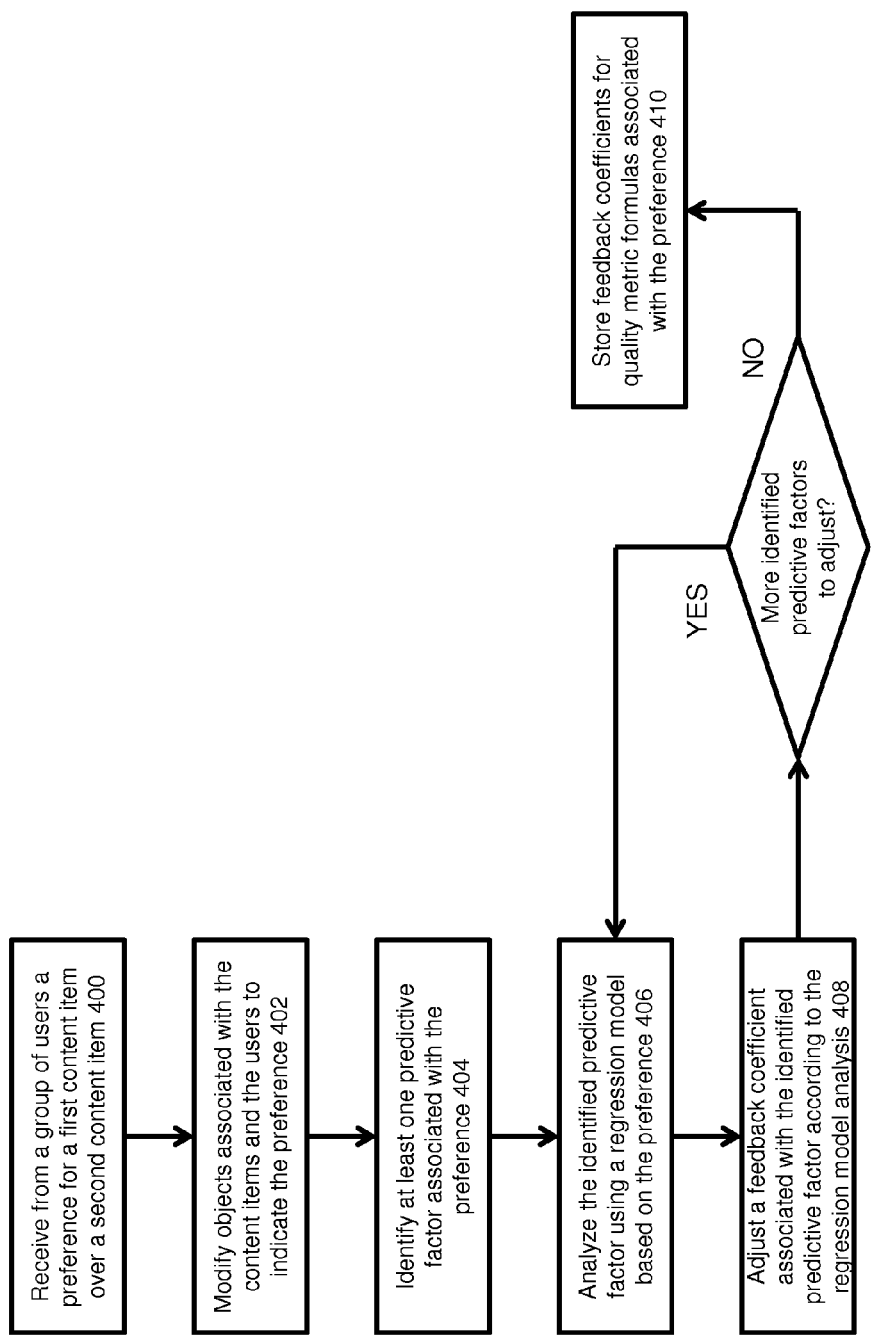
FIG. 4 is a flowchart illustrating processes for predicting quality measurements for content items on a social networking system, according to one embodiment.

Using Pair-Wise Comparisons to Generate Feedback Coefficients to Predict Content Quality FIG. 4 is a flowchart diagram depicting a process of generating feedback coefficients for predicting a quality score of content items to be presented to users of a social networking system, in accordance with an embodiment of the invention. Pair-wise comparisons indicating a preference for a first content item over a second content item are received 400 from a group of users. Objects associated with the first and second content items and the users are modified 402 to indicate the pair-wise comparisons.

At least one predictive factor associated with the preference is identified 404. The predictive factors may include any signals of information available in the social networking system, such as static data (e.g., information in a user's profile, such as interests), social data (e.g., information about the user's connections), historical data (e.g., information about the user's previous interactions with content items), and any other information signal that may be helpful in predicting a user's impression of a content item's quality. The identified predictive factors are analyzed 406 using a regression model, which is trained using the results of the pair-wise comparisons 406. A feedback coefficient associated with each identified predictive factor is adjusted 408 or otherwise obtained based on this training. In one embodiment, an initial feedback coefficient is predetermined by administrators of the social networking system 100. As more feedback is received from polled users 120, the pair-wise comparisons can be incorporated into the feedback coefficients using this process. Finally, if other predictive factors associated with the pair-wise comparisons have been identified, then the process repeats at step 406. Otherwise, the feedback coefficients for the quality metric formulas associated with the pair-wise comparison are stored 410. Once the model is obtained, it may then be used to predict other users' impressions of the quality of selected content items.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

For example, although embodiments of the invention have been described in terms of advertisements, pair-wise comparison polling can be implemented to rank other content items besides advertisements. For example, news articles that are shared between users may be ranked in presentation to other users using the above-described method to determine an objective measure of the quality of the news articles as determined from polling results.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   determining interests for each of a plurality of users of a social networking system, a respective interest for each user based on information provided by the respective user;
   inferring a preference of a user of the plurality of users for a first content item over a second content item, the inferring predicting, based on at least one of the determined interests for the user, which of the first and second content items the user would choose in a pair-wise comparison of the first and second content items;
   identifying at least one predictive factor associated with the inferred preference for the first content item over the second content item;
   for each identified predictive factor, determining a feedback coefficient for the identified predictive factor based on the inferred preference; and storing the feedback coefficients for the identified predictive factors in a computer-readable storage medium.

2. The computer-implemented method of claim 1, wherein determining the feedback coefficient comprises:
    analyzing the inferred preference using a statistical model; and
    determining the feedback coefficient as a result of the analyzing.

3. The computer-implemented method of claim 2, wherein determining the feedback coefficient further comprises:
    analyzing the inferred preference using a logistic regression; and
    determining the feedback coefficient as a result of the analyzing.

4. The computer-implemented method of claim 1, further comprising:
    receiving new content items for display to a user;
    generating a quality score for each of the new content items based on a combination of the stored feedback coefficients for the identified predictive factors and profile information about the user; and
    ranking the new content items for display based on the generated quality scores.

5. The computer-implemented method of claim 1, wherein the content items include advertisements for display to users of the social networking system.

6. The computer-implemented method of claim 1, wherein the content items include photos shared by users of the social networking system.

7. The computer-implemented method of claim 1, wherein the content items include music shared by users of the social networking system.

8. The computer-implemented method of claim 1, wherein the content items include videos shared by users of the social networking system.

9. The computer-implemented method of claim 1, wherein the content items include specified users, links to external websites, fan pages, groups of users, or interests shared by users of the social networking system.

10. The computer-implemented method of claim 1, wherein inferring a preference comprises:
    receiving quantifiable scores of a plurality of content items; and
    for each of the plurality of content items, generating a unique pair-wise comparison of two of the plurality of content items by ranking the content items by quantifiable scores associated with the content items, the ranking indicating the inferred preference of the user for the first content item over the second content item.

11. The computer-implemented method of claim 1, wherein the first and second content items are advertisements, the method further comprising:
    for each advertisement available for display to a user, determining a quality perception score for the user by combining the feedback coefficients and determined interests for the user;
    providing for display to the user a quality advertisement based on the quality perception score associated with the quality advertisement.

12. A non-transitory computer-readable storage medium storing instructions, the instructions when executed by a processor in a social networking system for predicting quality of content items, causes the processor to:
    determine interests for each of a plurality of users of a social networking system, a respective interest for each user based on information provided by the respective user;
    infer a preference of a user of the plurality of users for a first content item over a second content item, the inferring predicting, based on at least one of the determined interests for the user, which of the first and second content items the user would choose in a pair-wise comparison of the first and second content items;
    identify at least one predictive factor associated with the inferred preference for the first content item over the second content item;
    for each identified predictive factor, determine a feedback coefficient for the identified predictive factor based on the inferred preference; and
    store the feedback coefficients for the identified predictive factors in a computer-readable storage medium.

13. The computer-readable storage medium of claim 12, wherein determining the feedback coefficient comprises:
    analyzing the inferred preference using a statistical model; and
    determining the feedback coefficient as a result of the analyzing.

14. The computer-readable storage medium of claim 13, wherein determining the feedback coefficient further comprises:
    analyzing the inferred preference using a logistic regression; and
    determining the feedback coefficient as a result of the analyzing.

15. The computer-readable storage medium of claim 12, wherein the executed instructions further cause the processor to:
    receive new content items for display to a user;
    generate a quality score for each of the new content items based on a combination of the stored feedback coefficients for the identified predictive factors and determined interests for the user; and
    rank the new content items for display based on the generated quality scores.

16. The computer-readable storage medium of claim 12, wherein the content items include advertisements for display to users of the social networking system.

17. The computer-readable storage medium of claim 12, wherein the content items include links to external websites shared by users of the social networking system.

18. A system comprising:
    a processor;
    a non-transitory computer readable storage medium for storing software modules; and
    a polling analysis module configured to:
        determine interests for each of a plurality of users of a social networking system, a respective interest for each user based on information provided by the respective user;
        infer a preference of a user of the plurality of users for a first content item over a second content item, the inferring predicting, based on at least one of the determined interests for the user, which of the first and second content items the user would choose in a pair-wise comparison of the first and second content items;
        identify at least one predictive factor associated with the inferred preference for the first content item over the second content item;

for each identified predictive factor, determine a feedback coefficient for the identified predictive factor based on the inferred preference; and store the feedback coefficients for the identified predictive factors in a computer-readable storage medium.

19. The system of claim 18, wherein determining the feedback coefficient comprises:

analyzing the inferred preference using a statistical model; and determining the feedback coefficient as a result of the analyzing.

20. The system of claim 19, wherein determining the feedback coefficient further comprises:

analyzing the inferred preference using a logistic regression; and determining the feedback coefficient as a result of the analyzing.

21. The system of claim 18, wherein the polling analysis module is further configured to:

receive new content items for display to a user;

generate a quality score for each of the new content items based on a combination of the stored feedback coefficients for the identified predictive factors and determined interests for the user; and rank the new content items for display based on the generated quality scores.

22. The system of claim 18, wherein the content items include advertisements for display to users of the social networking system.

23. The system of claim 18, wherein the content items include links to external websites shared by users of the social networking system.

* * * * *